United States Patent
Konda et al.

[11] Patent Number: 6,132,105
[45] Date of Patent: Oct. 17, 2000

[54] MULTI-CORE-FIBER OPTICAL CONNECTOR

[75] Inventors: Hideya Konda; Kazuki Sogabe, both of Osaka; Shoji Sugino, Kyoto, all of Japan

[73] Assignee: Suncall Corporation, Kyoto, Japan

[21] Appl. No.: 09/304,950

[22] Filed: May 5, 1999

[30] Foreign Application Priority Data

May 25, 1998 [JP] Japan .................................. 10-143073

[51] Int. Cl.[7] ...................................................... G02B 6/38
[52] U.S. Cl. .............................................................. 385/65
[58] Field of Search ................................. 385/65, 22, 20, 385/21, 134, 137

[56] References Cited

U.S. PATENT DOCUMENTS 4,252,407  2/1981  Bubanko et al. .
5,446,810  8/1995  Watanabe .................................. 385/22

FOREIGN PATENT DOCUMENTS 0 388 642    9/1990   European Pat. Off. .
55-151610   11/1980   Japan .
57-139716    8/1982   Japan .
4-026809     1/1992   Japan .
8-334653    12/1996   Japan .
9-026527     1/1997   Japan .

*Primary Examiner*—Frank G. Font
*Assistant Examiner*—Roy M. Punnoose
*Attorney, Agent, or Firm*—McDermott, Will & Emery

[57] ABSTRACT

A multi-core-fiber optical connector includes a first ferrule and a second ferrule. The first ferrule has a first step defining a first upper surface and a first lower surface. The first upper surface has a plurality of first receiving grooves for receiving the vicinities of leading end portions of optical fibers and engaging portions formed on opposite sides of the first upper surface. The second ferrule has a second step being abuttable against the first step, and defining a second lower surface opposite to the first upper surface and a second upper surface opposite to the first lower surface. The second lower surface has a plurality of second receiving grooves receiving the leading end portions of the optical fibers. The second upper surface has engaged portions engageable with said engaging portions, and is formed with a recess receiving a band-like elastic cushioning member therein. The first and second ferrules are detachably joined with each other in conjunction with the engagement of the engaging portions and the engaged portions.

7 Claims, 4 Drawing Sheets

MULTI-CORE-FIBER OPTICAL CONNECTOR

BACKGROUND OF THE INVENTION

1. Field of the Invention

The present invention relates to a multi-core-fiber optical connector for connecting two groups of a plurality of optical fibers to each other easily.

2. Description of the Related Art

As shown in FIG. 5, an optical fiber 1 has a double-layer structure in which a core 2 serving as an optical signal transmission path is surrounded by a clad 3 concentrically. The refractive index of the core 2 is set to be slightly higher than the refractive index of the clad 3 so that an optical signal passing through the core 2 does not escape out through the clad 3.

In the related art, a multi-core optical connector was used when two groups of a plurality of optical fibers 1, 1 . . . are connected to each other. To align optical axes at the time of butting, guide pins are provided side by side in a ferrule of one connector part so that optical fibers are held between the guide pins, whereas guide pin through-holes are provided in the other connector part so as to be located in positions corresponding to the positions of the guide pins. The guide pins are inserted in the guide pin through-holes to join the two connector parts to thereby connect the two groups of optical fibers 1, 1 . . . to each other.

In the related multi-core optical connector, not only accuracy for the guide pins and guide pin through-holes and accuracy for holes between the optical fibers 1, 1 . . . were required but also the steps of bonding the optical fibers 1 to the ferrules, polishing the butting faces thereof, and so on, were required. Accordingly, a lot of troublesome working processes were required, so that the cost increased. In addition, on-site connecting work required skill.

SUMMARY OF THE INVENTION

The present invention is designed to solve the aforementioned problem and an object of the invention is to provide a multi-core-fiber optical connector in which not only troublesome working steps can be omitted to attain reduction in cost but also on-site connecting work can be simplified. [0006]

[Means for Solving the Problem]

In order to achieve the above object, according to the present invention, there is provided a multi-core-fiber optical connector including a first ferrule and a second ferrule. The first ferrule has a first step defining a first upper surface and a first lower surface. The first upper surface has a plurality of first receiving grooves for receiving the vicinities of leading end portions of optical fibers and engaging portions formed on opposite sides of the first upper surface. The second ferrule has a second step being abuttable against the first step, and defining a second lower surface opposite to the first upper surface and a second upper surface opposite to the first lower surface. The second lower surface has a plurality of second receiving grooves receiving the leading end portions of the optical fibers. The second upper surface has engaged portions engageable with said engaging portions, and is formed with a recess receiving a band-like elastic cushioning member therein. The first and second ferrules are detachably joined with each other in conjunction with the engagement of the engaging portions and the engaged portions.

DETAILED DESCRIPTION OF THE PREFERRED EMBODIMENT

Figure 1:
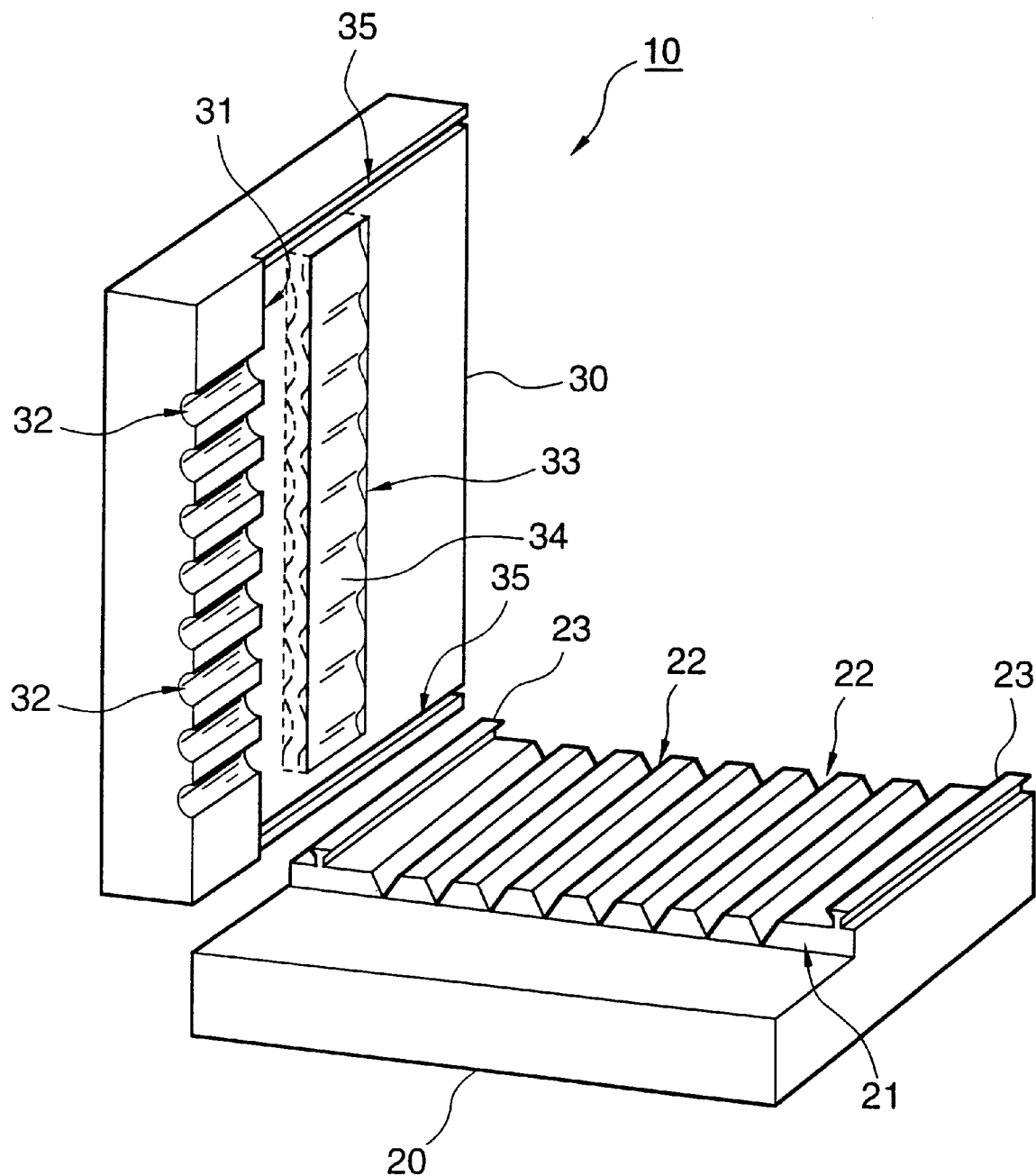
FIG. 1 is a perspective view showing a state in which a multi-core-fiber optical connector according to the present invention is exploded.
Figure 2:
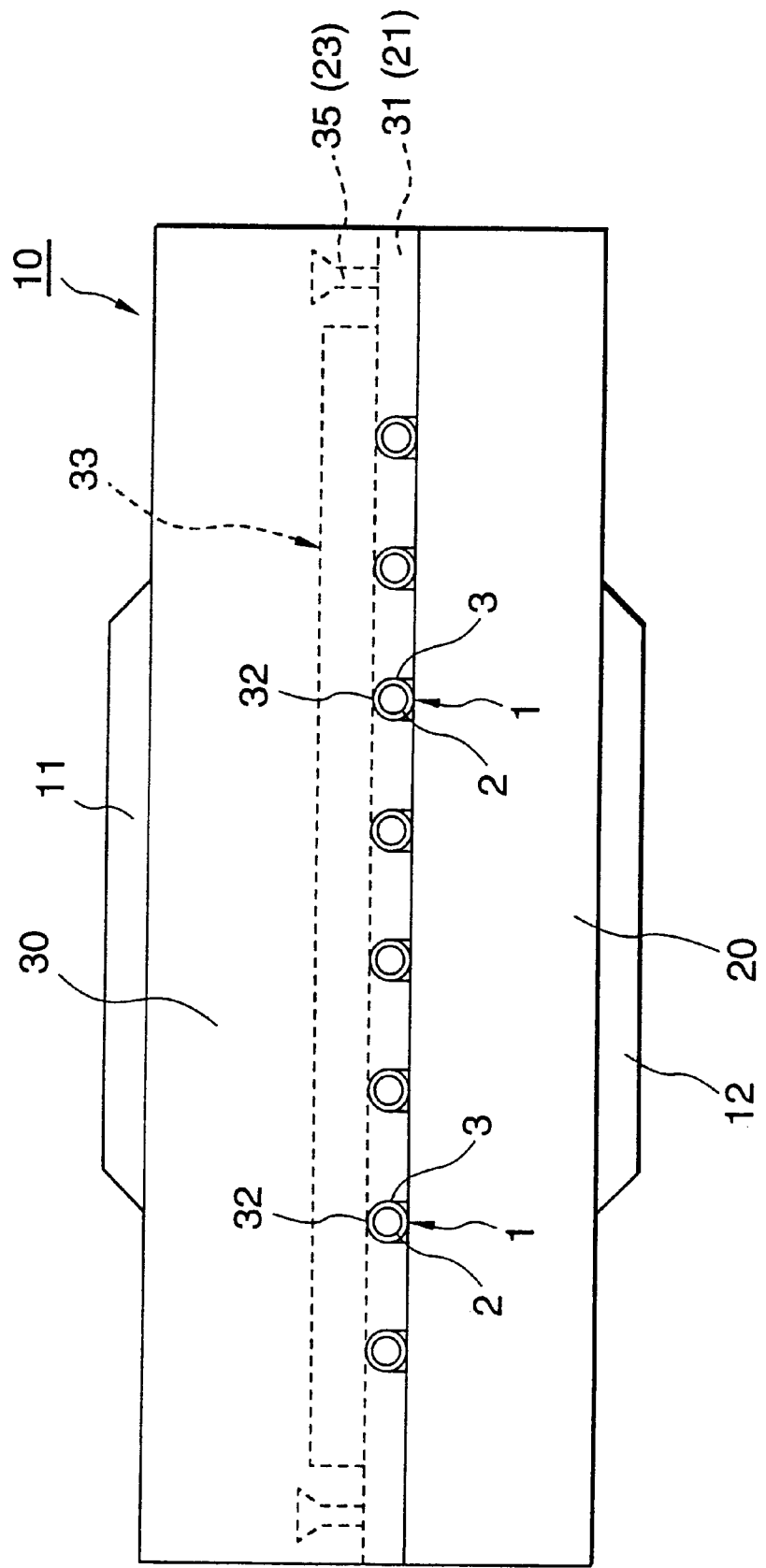
FIG. 2 is a front view of the multi-core-fiber optical connector according to the present invention showing a state in which optical fibers are connected to the optical connector.
Figure 3:
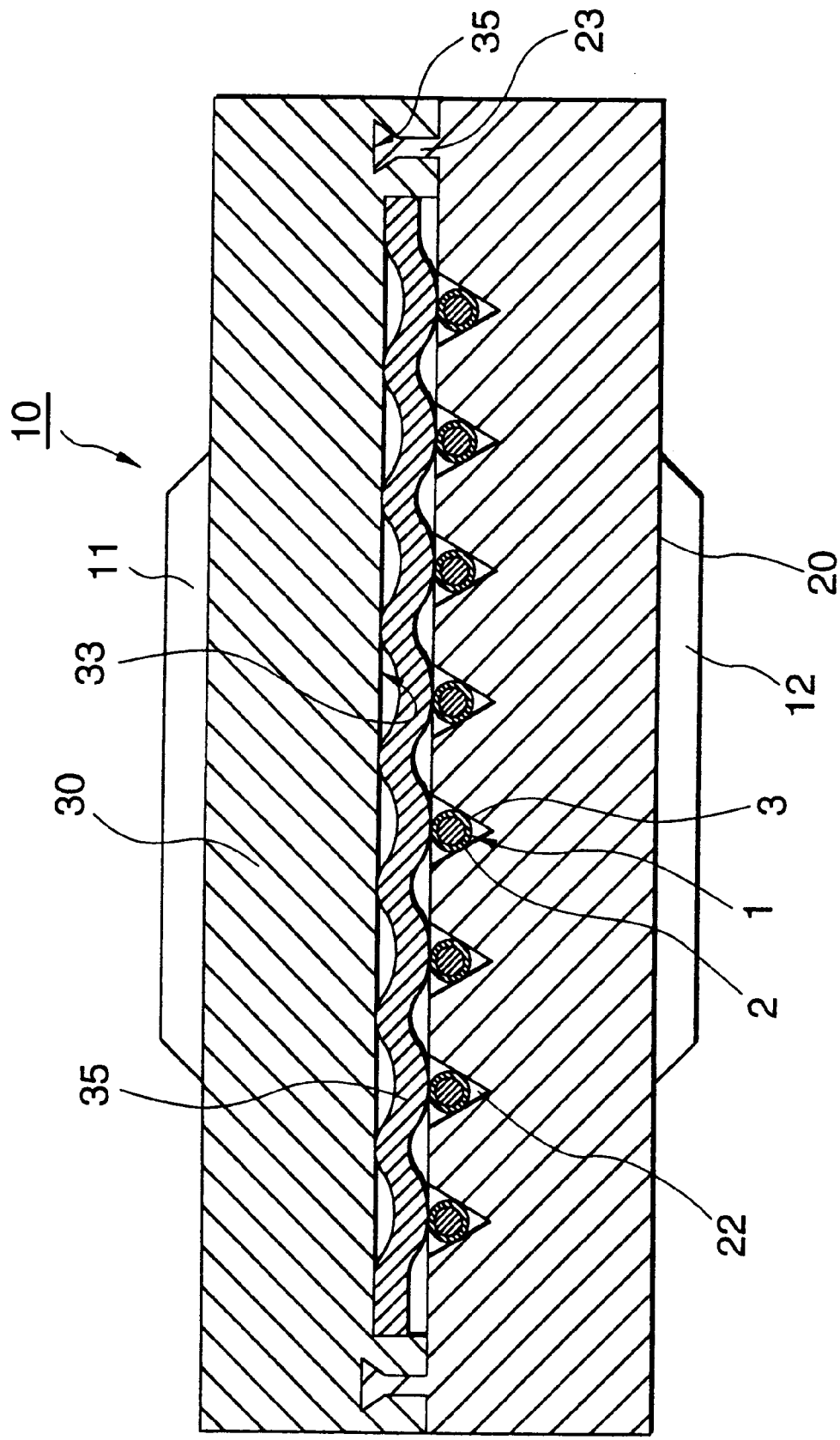
FIG. 3 is a sectional view of a main part of the multi-core-fiber optical connector according to the present invention showing a state in which optical fibers are connected to the optical connector.
Figure 4:
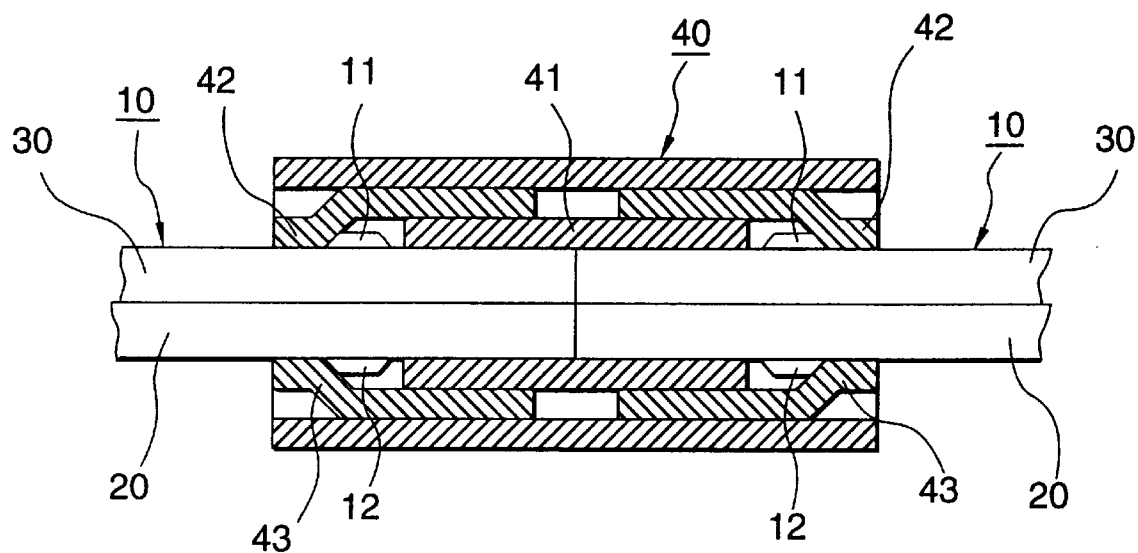
FIG. 4 is a sectional view showing a state in which two groups of optical fibers are coupled with each other by means of multi-core-fiber optical connectors according to the present invention.
Figure 5:
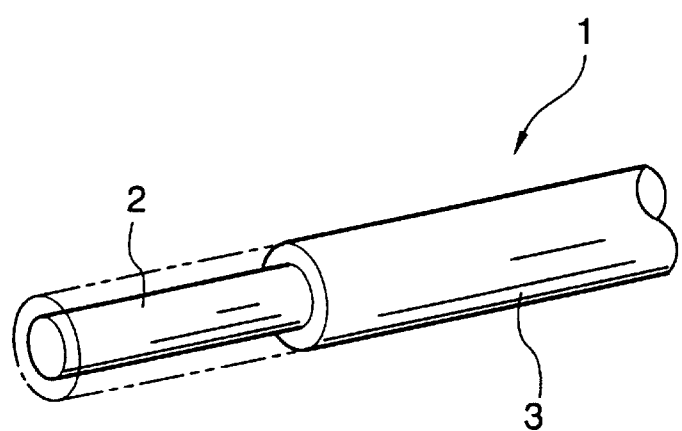
FIG. 5 is a perspective view of a main part of an optical fiber.

FIGS. 1 to 4 show an embodiment of a multi-core-fiber optical connector according to the present invention. FIG. 1 is a perspective view showing a state in which the optical connector is exploded. FIG. 2 is a front view showing a state in which optical fibers are connected to the optical connector. FIG. 3 is a sectional view of a main part showing a state in which optical fibers are connected to the optical connector. FIG. 4 is a sectional view showing a state in which two groups of a plurality of optical fibers are coupled to each other by the connector.

In FIGS. 1 to 3, the reference numeral 10 designates a multi-core-fiber optical connector according to the present invention. The multi-core-fiber optical connector 10 is constituted by first and second ferrules 20 and 30 each of which is made from a plastic material, PBT, LCP, or the like.

The first ferrule 20 has a step 21 on its upper surface (a surface facing the second ferrule 30). A plurality of V-shaped grooves 22 for receiving the vicinities of leading end portions of optical fibers 1 are disposed side by side at intervals of a predetermined pitch in a surface located on the upper side of the step 21. Further, parallelly with the V-shaped grooves 22, wedge-shaped (for example, reverse-trapezoidal) ridges 23 are formed, on the opposite sides, on the surface located on the upper side of the step 21 of the first ferrule 20.

The second ferrule 30 has a step 31 formed on its lower surface which faces the first ferrule 20 so that the step 31 may butt against the step 21 of the first ferrule 20. A plurality of U-shaped grooves 32, which are equal in number to the V-shaped grooves 22, for receiving the leading end portions of the optical fibers 1 are formed side by side at intervals of a predetermined pitch, which is equal to the pitch of the V-shaped grooves 22, in a surface located on the lower side of the step 31. Further, a cavity 33 is formed in an intermediate portion of a surface located on the upper side of the step 31 of the second ferrule 30. An undulated leaf spring 34 made from a stainless steel material is embedded in the cavity 33. The undulation of the leaf spring 34 is formed so that not only the centers of downward convex portions of the leaf spring 34 coincide with the centers of the V-shaped grooves 22 of the first ferrule 20 but also the number of the downward convex portions is equal to the number of the V-shaped grooves 22. Further, the undulated downward convex portions of the leaf spring 34 are formed so that the center portions of the downward convex portions are slightly protruded from the surface located on the upper side of the step 31. Further, wedge-shaped (for example, reverse-trapezoidal) grooves 35 are provided on the opposite sides of the surface located on the upper side of the step 31 of the second ferrule 30 so that the ridges 23 of the first ferrule 20 are fitted into the grooves 35.

The technique of connecting a plurality of optical fibers 1, 1 . . . to the aforementioned multi-core-fiber optical connector 10 will be described below. First, optical fibers 1, 1 . . . are prepared by the number equal to that of the V-shaped grooves 22 of the first ferrule 20. The vicinities of leading end portions of the optical fibers 1, 1 . . . are received in the V-shaped grooves 22, 22 . . . , respectively, of the first ferrule 20. At the same time, the leading end portions of the optical fibers 1, 1 . . . are put on the surface located on the lower side of the step 21 of the first ferrule 20. Then, in the condition that the end portions of the ridges 23, 23 of the first ferrule 20 are fitted into the end portions of the grooves 35, 35 of the second ferrule 30, the second ferrule 30 is slid in the longitudinal direction toward rear ends of the optical fibers 1, 1 . . . till the step 31 of the second ferrule 30 strikes against the step 21 of the first ferrule 20. Alternatively, the ridges 23, 23 of the first ferrule 20 are press-fitted into the grooves 35, 35 of the second ferrule 30. Thus, the second ferrule 30 is made to butt against the first ferrule 20. Accordingly, not only the first and second ferrules 20 and 30 are restricted in the longitudinal direction by the steps 21 and 31 but also the first and second ferrules 20 and 30 are also restricted both in the direction of width and in the direction of height by the ridges 23, 23 and the grooves 35, 35. Accordingly, the first and second ferrules 20 and 30 are put in position so as to be joined with each other accurately. Further, in the condition that the leading end portions of the optical fibers 1, 1 . . . put on the surface located on the lower side of the step 21 of the first ferrule 20 are received and pressed in the U-shaped grooves 32 of the second ferrule 30, the vicinities of the leading end portions of the optical fibers 1, 1 . . . received respectively in the V-shaped grooves 22 of the first ferrule 20 are pressed by the leaf spring 34 so that the optical fibers 1, 1 . . . can be fixed between the first and second ferrules 20 and 30. Then, the leading ends of the optical fibers 1, 1 . . . are subjected to ordinary cutting treatment in order to make end surfaces of the optical fibers 1, 1 . . . even.

The knack of connecting a group of optical fibers 1, 1 . . . to another group of optical fibers 1, 1 . . . , respectively, by means of the aforementioned multi-core-fiber optical connector 10 will be described below with reference to FIG. 4. First, two multi-core-fiber optical connectors 10, 10 having two groups of optical fibers 1, 1 . . . which are equal in number and which are to be connected to each other respectively, and a flat rectangular cylindrical adapter 40 are prepared. Further, lock protrusions 11 and 12 are respectively provided on the upper and lower surfaces of two multi-core-fiber optical connectors 10, 10, (that is, the upper surface of the second ferrule 30 and the lower surface of the first ferrule 20). Then, the two multi-core-fiber optical connectors 10, 10 are then inserted in the adapter 40 from opposite end openings of a guide member 41 of the adapter 40 so that the two multi-core-fiber optical connectors 10, 10 butt against each other in the center portion of the adapter 40. At this time, the lock protrusions 11 and 12 provided on the respective upper and lower surfaces of the two multi-core-fiber optical connectors 10, 10 are locked by holding pawls 42 and 43 of the adapter 40 so that the two multi-core-fiber optical connectors 10, 10 are locked in the adapter 40. Accordingly, the optical fibers 1, 1 . . . connected to the one multi-core-fiber optical connector 10 can be connected, concentrically, to the optical fibers 1, 1 . . . which are equal in number to the former and connected to the other multi-core-fiber optical connector 10 in the condition that the leading ends of the optical fibers 1, 1 . . . of the one group butt against those of the other group within the guide member 41 of the adapter 40.

Axis displacement and connection loss between a group of eight optical fibers 1, 1 . . . and another group of eight optical fibers 1, 1 . . . which were connected to each other by use of the aforementioned multi-core-fiber optical connectors 10 were measured. Each optical fiber had an outer diameter of 430 µm. As a result, there was obtained a product in which the axis displacement between the one group of eight optical fibers 1, 1 . . . and the other group of eight optical fibers 1, 1 . . . was equal to or smaller than 0.150 mm and the connection loss was in a range of from 1.0 to 2.0 dB.

Although the above description has been made about the case where the vicinities of the leading end portions of the optical fibers 1, 1 . . . received respectively in the V-shaped grooves 22 of the first ferrule 20 are pressed by the leaf spring 34 so that the optical fibers 1, 1 . . . are fixed, the leaf spring 34 may be replaced by a band-like elastic cushioning material such as polyurethane which is embedded in the cavity 33 of the second ferrule 30 so that the vicinities of the leading end portions of the optical fibers 1, 1 . . . are pressed by the elastic cushioning material to thereby make it possible to fix the optical fibers 1, 1 . . . .

In the above embodiment, although the ridges 23, 23 are provided in the first ferrule 20 and the grooves 35, 35 are provided in the second ferrule 30, the ridges 23, 23 and the grooves 35, 35 are replaceable to each other.

As described above, in the multi-core-fiber optical connector according to the present invention, the first and second ferrules can be positioned and joined with each other accurately by the steps and the wedge-shaped ridges and grooves, and a plurality of optical fibers can be fixed by a belt-like elastic cushioning material such as a leaf spring, or the like. Accordingly, not only the related-art steps of bonding the optical fibers to the ferrules, polishing the butting surfaces thereof, etc. become unnecessary but also the step of removal of depositions of an adhesive agent can be omitted. Accordingly, not only the omission of the steps contributes to reduction of cost but also there are obtained practical effects, for example, in that on-site connecting work can be simplified.

What is claimed is:

1. A multi-core-fiber optical connector comprising:
 a first ferrule having a first step defining a first upper surface and a first lower surface, said first upper surface having a plurality of first receiving grooves for receiving the vicinities of leading end portions of optical fibers and engaging portions formed on opposite sides of said first upper surface;
 a second ferrule having a second step being abuttable against said first step and defining a second upper surface opposite to said first upper surface and a second lower surface opposite to said first lower surface, said second lower surface having a plurality of second receiving grooves for receiving the leading end portions of the optical fibers, said second upper surface having engaged portions engageable with said engaging portions, said second upper surface being formed with a recess; and
 a band-like elastic cushioning member located in said recess of said second ferrule,
 wherein said first and second ferrules are detachably joined with each other in conjunction with the engagement of said engaging portions and said engaged portions.

2. The multi-core-fiber optical connector according to claim 1, wherein said first receiving grooves are respectively formed in a substantially V-shape and are located side by side at intervals of a predetermined pitch.

3. The multi-core-fiber optical connector according to claim 1, wherein said second receiving grooves are respectively formed in a substantially U-shape and are located side by side at intervals of a predetermined pitch.

4. The multi-core-fiber optical connector according to claim 1, wherein said engaging portion is a wedge-shaped projection, and said engaged portion is a corresponding wedge-shaped groove.

5. The multi-core-fiber optical connector according to claim 1, wherein said engaging portion is a wedge-shaped groove, and said engaged portion is a corresponding wedge-shaped projection.

6. The multi-core-fiber optical connector according to claim 1, wherein said elastic cushioning member is an undulated leaf spring.

7. A joint apparatus for a multi-core-fiber optical connector, comprising:

first and second multi-core-fiber optical connectors according to claim 1, each of said optical connectors having a pair of retaining protrusions on opposing surfaces thereof; and an adapter joining said first and second optical connectors so that the leading end portions of the optical fibers of said first and second optical connectors butt to each other concentrically, said adapter including a rectangular cylinder guide member having opposite openings which receive said first and second optical connectors, and holding members engageable with said retaining protrusions so as to retain said first and second optical connectors within said guide member.

\* \* \* \* \*